F. H. SCHROEDER.
Hopper for Grain Separators.
No. 46,947.
Patented March 21, 1865.
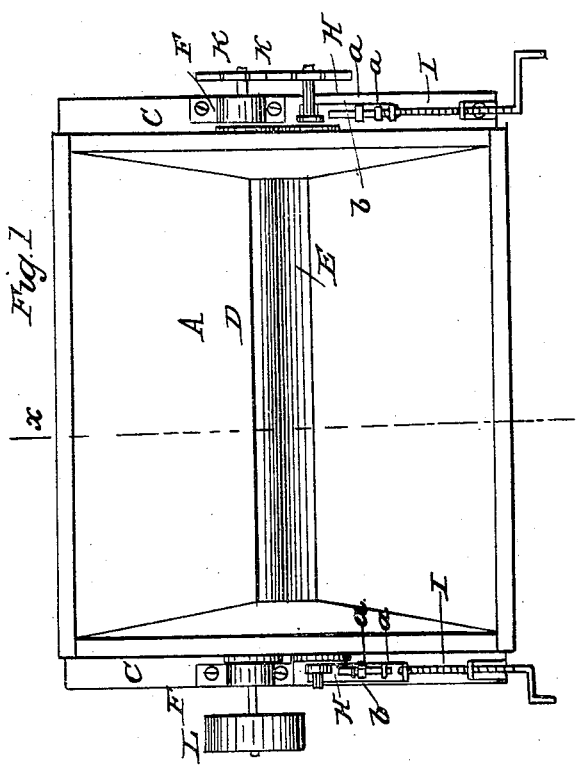
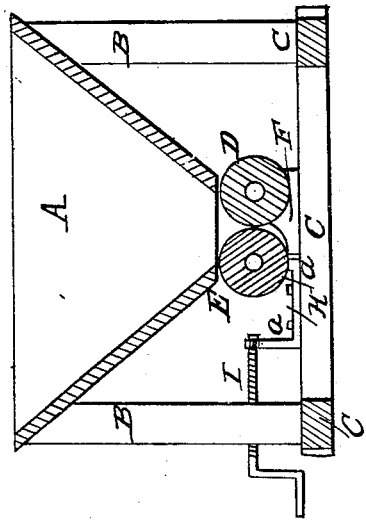
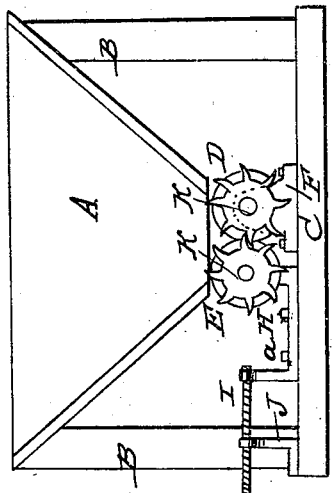
Witnesses
Lewis L. Coburn
W. E. Mann
Inventor
F. H. Schroeder

UNITED STATES PATENT OFFICE.

FREDERICK H. SCHROEDER, OF BUSHNELL, ILLINOIS.

IMPROVED HOPPER FOR GRAIN-SEPARATORS.

Specification forming part of Letters Patent No. 46,947, dated March 21, 1865.

*To all whom it may concern:*

Be it known that I, FREDERICK H. SCHROEDER, of Bushnell, in the county of McDonough and State of Illinois, have invented a new and useful Improvement in Grain-Separators; and I do hereby declare that the following is a full, clear, and exact description of the same, reference being had to the accompanying drawings and letters of reference marked thereon, which form a part of this specification, and in which—

Figure 1 is a top or plan view of my invention; Fig. 2, an end view of the same; Fig. 3, a sectional view at the red line X in Fig. 1.

The nature of my invention consists in the employment of rollers under the hopper of a grain-separator to regulate the feed of the grain to said machine, as hereinafter fully described.

To enable those skilled in the art to manufacture and use my invention, I will proceed to describe the same with particularity.

A represents the ordinary grain-hopper, supported upon the standards B B, which in turn rest upon the frame C, which represents the top of any ordinary grain-separator. Beneath said hopper A, just at the place where the grain is discharged therefrom, I place the rollers D and E. The roller D rests upon a bearing, F, attached firmly to the frame C, while the roller E rests upon the movable bearing H. The said movable bearing H is attached to the frame C by means of the bolts *a a*, and is allowed to slide thereon by the bolts *a a* passing through the slots *b*. The said movable bearing H is moved by means of the crank-screws I I, which screw through the standards J J and slide the bearings H H back and forth at the discretion of the operator.

Of course the object of making the bearings H H movable is to move the roller E to or from the stationary roller D, to regulate the quantity of grain that would pass between them to the capacity of the machine.

L is the drum or band-wheel, by means of which I communicate motion to the stationary roller D, and it in turn communicates motion to the roller E by means of the cog-wheels K K, the cogs thereof being so constructed as to admit of the adjustment of the roller E, as above described.

I do not wish to confine myself to the use of cog-wheels, for I find that ordinary band-wheels with an elastic band to admit of the aforesaid adjustment answers the purpose equally as well. I place the rollers under the said hopper in such a manner that the grain, when thrown into the hopper, rests partially upon the rollers, and as the rollers revolve in toward each other they necessarily carry the grain down between them, the quantity thereof depending upon the distance said rollers are apart, which is regulated as above described.

My invention is designed more particularly to be used in large machines used in connection with grain-elevators, &c., where it will dispense with the time and attention of one man, which is necessary in all other machines, to keep the grain from clogging in the hopper, but I deem it of great value in all grain-separators and winnowing-mills.

Having thus fully described the construction and operation of my improvement, what I claim as my invention, and desire to secure by Letters Patent, is—

The employment of the rollers D and E in combination with the seed-hopper A, when arranged and operating substantially as and for the purposes set forth.

F. H. SCHROEDER.

Witnesses:
LEWIS L. COBURN,
W. E. MAUS.